(12) United States Patent
Roberson

(10) Patent No.: US 7,249,570 B1
(45) Date of Patent: Jul. 31, 2007

(54) DISPOSABLE NONSKID ABSORBENT PAD

(76) Inventor: Jermaine C Roberson, 801 Tilden St., apt. 17A, Bronx, NY (US) 10467

( * ) Notice: Subject to any disclaimer, the term of this patent is extended or adjusted under 35 U.S.C. 154(b) by 0 days.

(21) Appl. No.: 11/000,434

(22) Filed: Nov. 29, 2004

(51) Int. Cl.
*A01K 29/00* (2006.01)
(52) U.S. Cl. ..................................... 119/169
(58) Field of Classification Search ............... 119/161, 119/165, 169, 172, 171; D30/161
See application file for complete search history.

(56) References Cited

U.S. PATENT DOCUMENTS

| | | | |
|---|---|---|---|
| 229,436 A | 6/1880 | Mallett, Jr. | |
| 3,284,273 A | 11/1966 | Prentice | |
| 3,626,899 A * | 12/1971 | Spellman | 119/169 |
| 3,626,900 A | 12/1971 | Failla | |
| 3,752,121 A | 8/1973 | Brazell | |
| 4,517,919 A | 5/1985 | Benjamin et al. | |
| 4,715,320 A * | 12/1987 | Barnhart | 119/169 |
| 4,800,677 A | 1/1989 | Mack | |
| 4,836,141 A * | 6/1989 | Whitfield | 119/169 |
| 4,934,316 A | 6/1990 | Mack | |
| 5,482,007 A * | 1/1996 | Kumlin | 119/169 |
| 6,227,145 B1 * | 5/2001 | Miyamoto et al. | 119/172 |
| 6,244,216 B1 * | 6/2001 | Ochi | 119/169 |
| 6,460,484 B2 * | 10/2002 | Ikegami et al. | 119/169 |
| 6,550,423 B1 | 4/2003 | Pope | |
| 6,976,451 B2 * | 12/2005 | Helfman | 119/169 |
| 2002/0112669 A1 | 8/2002 | Holt, Jr. | |

FOREIGN PATENT DOCUMENTS

| | | |
|---|---|---|
| CA | 2.421.320 | 10/2003 |
| EP | 1048206 A2 * | 11/2000 |
| GB | 2.271.720 | 4/1994 |

* cited by examiner

*Primary Examiner*—Thomas Price
(74) *Attorney, Agent, or Firm*—Michael I Kroll

(57) ABSTRACT

Apparatus 10 for a pet 12, 14 training pad having a plurality of material layers to retain fluids and solid material; while preventing passage therethrough. The top layer serves as the absorbent material 16 with the bottom layer 18 forming a fluid impermeable layer to prevent passage of liquids. The impermeable layer 18 extends over the periphery edge of the top absorbent layer forming a hem 26 that is colored green to simulate grass. On the underside of the bottom layer 18, a plurality of adhesive or frictional members 20 are fastened thereto that will prevent movement, in whole or in part, from the selective placement of the pad. Optionally, a fragrance layer 22 can be incorporated into the pad between the fluid impermeable base layer 18 and the top absorbent layer 16 to attract pets 12, 14 to the pad.

8 Claims, 10 Drawing Sheets

DISPOSABLE NONSKID ABSORBENT PAD

BACKGROUND OF THE INVENTION

1. Field of the Invention

The present invention relates generally to absorbent pads and, more specifically, to a pet defecation training pad that is used to contain pet urine and fecal matter. The pad is comprised of a plurality of material layers to retain fluids and solid material, while preventing passage therethrough. In addition, the pad has placement retaining means to prevent displacement or movement, such as wrinkling or folding, which can result in leakage of the fluid material past the fluid impermeable layer or displacement of fecal material off of the pad onto the protected surface.

The top surface serves as the absorbent material with the bottom layer forming a fluid impermeable layer to prevent passage of liquids. The impermeable layer extends over the periphery edge of the top absorbent layer forming a hem that is colored green to simulate grass. On the underside of the bottom layer, a plurality of adhesive or frictional members are fastened thereto that will prevent movement, in whole or in part, from the selective placement of the pad. Optionally, a fragrance layer can be incorporated into the pad between the fluid impermeable base layer and the top absorbent layer to attract pets to the pad.

2. Description of the Prior Art

There are other pad device designed for absorption. Typical of these is U.S. Pat. No. 229,436 issued to Mallett, Jr. on Jun. 29, 1880.

Another patent was issued to Thomson on Jun. 14, 1960 as U.S. Pat. No. 2,940,449. Yet another U.S. Pat. No. 3,284,273 was issued to Prentice on Nov. 8, 1966 and still yet another was issued on Dec. 14, 1971 to Spellman as U.S. Pat. No. 3,626,899.

Another patent was issued to Failla on Dec. 14, 1971 as U.S. Pat. No. 3,626,900. Yet another U.S. Pat. No. 3,752,121 was issued to Brazzell on Aug. 14, 1973. Another was issued to Benjamin, et al. on May 21, 1985 as U.S. Pat. No. 4,517,919 and still yet another was issued on Jan. 31, 1989 to Mack as U.S. Pat. No. 4,800,677.

Another patent was issued to Mack on Jun. 19, 1990 as U.S. Pat. No. 4,934,316. Yet another U.S. Pat. No. 6,550,423 was issued to Pope on Apr. 22, 2003. Still another patent was filed by Holt, Jr. on Aug. 22, 2002 as U.S. Patent Publication 2002/0112669. Another was issued to Preiss on Apr. 27, 1994 as U.K. Patent No. GB2271720 and still yet another was issued on Oct. 1, 2003 to Pope as Canadian Patent No. CA2421320.

U.S. Pat. No. 229,436

Inventor: Edward J. Mallet, Jr.

Issued: Jun. 29, 1880

A urinal-mat comprising a layer or body of absorbent material impregnated with a disinfectant and a superposed open-work cover or grating, substantially as hereinbefore set forth.

U.S. Pat. No. 2,940,449

Inventor: Lloyd G. Thompson

Issued: Dec. 29, 1958

In combination with a sanitary napkin having a pad and a gauze cover therefor, of a receptacle positioned in said napkin at a point between said pad and said gauze covering and adjacent the end of said pad, said receptacle being separable, so that the contents thereof will be released when said parts are separated, and means for adhering the opposite ends of said receptacle to said gauze, whereby the stretching of said gauze will cause said separation.

U.S. Pat. No. 3,284,273

Inventor: Earl E. Prentice

Issued: Nov. 8, 1966

A laminated floor pad for standing support and for storing liquid contacting the same and including: (a) a base lamina of liquid absorbent paper felt with an impervious film on its lowermost supported face, (b) a top surface lamina of liquid absorbent paper felt spaced from and overlying the base lamina, a marginal spacer separating said laminae with a chamber space therebetween, (d) and a liquid retaining lamina comprised of a single layer of loose liquid saturable crush resistant pellets occupying the chamber space between said laminae and engageably supporting the surface laminae in order to uniformly space the first two mentioned laminae and to receive liquid therefrom and to store said liquid.

U.S. Pat. No. 3,626,899

Inventor: Frederick R. Spellman

Issued: Dec. 14, 1971

Absorbent material lined on one side thereof with fluid impervious material is impregnated with an odor imparting substance which attracts young dogs to the pads for the purpose of urination and defecation and discourages chewing of the pad by the young dog.

U.S. Pat. No. 3,626,900

Inventor: Fred Failla

Issued: Dec. 14, 1971

An inexpensive disposable dog commode comprising a preferably square, flexible sheet of moistureproof material adapted to be spread upon a flat-supporting surface such as a floor, pavement or the like and be held in such position while the dog uses the same, followed by the contraction of the edges and corners of the sheet to enclose the excrement for disposal in a suitable waste receptacle.

U.S. Pat. No. 3,752,121

Inventor: Jack W. Brazzell

Issued: Aug. 14, 1973

A reinforced bottom grooved plastic tray in which is placed disposable pads, each pad comprising a top layer of artificial grass impregnated with an animal attractant, which is adhered to a perforated plastic sheet beneath which is an absorbent layer backed by an impervious sheet. A container of deodorizer and a plurality of disposable pads may be packaged with each tray.

U.S. Pat. No. 4,517,919

Inventor: Lawrence Benjamin, et al

Issued: May 21, 1985

Solid absorbent materials, having adsorbed thereto from about 1000 ppm to about 10,000 ppm of an undecylenic acid, when used as animal litter products, effectively prevent the development of urine odors. Absorbent pads having absorbed thereto from about 5000 ppm to about 100,000 ppm of the undecylenic acid when used as liners in litter boxes likewise effectively control odor development.

U.S. Pat. No. 4,800,677

Inventor: Robert J. Mack

Issued: Jan. 31, 1989

An animal waste collection pad having a backing sheet of fluid impervious material, a non-woven top sheet thereon. An absorbent pad is disposed on the backing sheet and the pad contains a scent, attractive to dogs. The scent may be provided by a frangible capsule, a micro encapsulated scent incorporated in the pad or a spray applied to the pad. There are tapes or drawstrings attached to the backing sheet for tying the animal waste collection pad into a small compact package for disposal.

U.S. Pat. No. 4,934,316

Inventor: Robert J. Mack

Issued: Jun. 19, 1990

A litter box liner comprising a rectangular absorbent pad having a waterproof backing sheet provided with absorbent material thereon. Glue lines or spots are provided on the top face thereof for holding the liner in a box-like configuration conforming to the contours of the litter box. Other glue lines or spots are provided on the bottom surface of the backing sheet for adhesively bonding the liner to the litter box.

U.S. Pat. No. 6,550,423

Inventor: Susan Crawford Pope

Issued: Apr. 22, 2003

An absorbent dog waste disposal pad holder lacking an underlying bottom wall and having nestable upper and lower frames that cooperate to form a peripheral wall to securely hold the periphery of a disposable, absorbent pad therebetween. Each nestable upper and lower frame comprises first and second frame members. The first and second frame members of the lower frame preferably comprise opposite side ends that interlock to form the lower frame. The first and second frame members of the upper frame preferably comprise ends that abut to form the upper frame. Preferably, the frames of the absorbent dog waste disposal pad holder are generally rectangular shaped, are made of moldable polymeric material and have an inverted U-shaped cross section. A method of assembling the subject absorbent dog waste disposal pad holder is also disclosed.

U.S. Patent Publication Number 2002/0112669

Inventor: Robert C. Holt, Jr.

Issued: Aug. 22, 2002

A system for holding a pad, such as a pet training pad, includes a plurality of corner members including a base portion made of a rigid plastic material and an insert portion made of a resilient material. A frame is formed by interconnecting the corner members with connector members preferably in the form of rods. The insert portion is provided with a plurality of cuts which receive and hold the pad near the corners thereof.

U.K. Patent Number GB2271720

Inventor: Shoshana Preiss

Issued: Apr. 27, 1994

A disposable sanitary article 10 comprises: a pad of absorbent material; a disposable bag made of an impervious material that is releasably attached to the pad; and one or more members of impervious material of which each sealingly encloses a cleaning item, the or each member being itself enclosed by the bag. The or each member may be wrapped up in the bag, or may be disposed inside the bag or may be formed integrally with the bag—in which case the or each member is frangibly separable (e.g. via tearable perforations) from the bag. The sanitary articles may be a sanitary napkin for the absorption of menstrual emissions, or an incontinence article, or a nappy or diaper. The cleaning items may be a cleaning cloth moistened with a volatile cleaning fluid, or a dry cloth, or talcum powder, or cleansing cream or lotion, or a cream or lotion applicator (e.g. a cotton wool pad).

Canadian Patent Number CA 2421320

Inventor: Susan Crawford Pope

Issued: Oct. 1, 2003

An absorbent dog waste disposal pad holder lacking an underlying bottom wall and having nestable upper and lower frames that cooperate to form a peripheral wall to securely hold the periphery of a disposable, absorbent pad therebetween. Each nestable upper and lower frame comprises first and second frame members. The first and second frame members of the lower frame preferably comprise opposite side ends that interlock to form the lower frame. The first and second frame members of the upper frame preferably comprise ends that abut to form the upper frame. Preferably, the frames of the absorbent dog waste disposal pad holder are generally rectangular shaped, are made of moldable polymeric material and have an inverted U-shaped cross section. method of assembling the subject absorbent dog waste disposal pad holder is also disclosed While these absorbent pads may be suitable for the purposes for which they were designed, they would not be as suitable for the purposes of the present invention, as hereinafter described.

SUMMARY OF THE PRESENT INVENTION

The present invention discloses a pet training pad having a plurality of material layers to retain fluids and solid material; while preventing passage therethrough. The top layer serves as the absorbent material with the bottom layer forming a fluid impermeable layer to prevent passage of liquids. The impermeable layer extends over the periphery edge of the top absorbent layer forming a hem that is colored green to simulate grass. On the underside of the bottom layer, a plurality of adhesive or frictional members are fastened thereto that will prevent movement, in whole or in part, from the selective placement of the pad. Optionally, a fragrance layer can be incorporated into the pad between the fluid impermeable base layer and the top absorbent layer to attract pets to the pad.

A primary object of the present invention is to provide a nonskid absorbent pad for pets.

Another object of the present invention is to provide a nonskid absorbent pad for pets having a plurality of material layers for absorbing and protecting a surface with position retaining means preventing movement.

Yet another object of the present invention is to provide a nonskid absorbent pad for pets with a top absorbent layer having a hem colored green to act as a training aid.

Still yet another object of the present invention is to provide a nonskid absorbent pad for pets with a bottom layer of a fluid impermeable material.

Another object of the present invention is to provide a nonskid absorbent pad for pets that optionally incorporates a fragrance impregnated layer.

Yet another object of the present invention is to provide a nonskid absorbent pad for pets having a plurality of frictional or adhesive elements attached to the underside of the pad to prevent casual movement of the pad.

Still yet another object of the present invention is to provide a package of said nonskid absorbent pads wherein some of the pads incorporate a fragrance layer while other do not.

Another object of the present invention is to provide a pad for pet carriers and cages that will not be displaced through activity of the pet.

Additional objects of the present invention will appear as the description proceeds.

The present invention overcomes the shortcomings of the prior art by providing a pet defecation training pad that is used to contain pet urine and fecal matter. The pad is comprised of a plurality of material layers to retain fluids and solid material, while preventing passage therethrough. In addition, the pad has placement retaining means to prevent displacement or movement, such as wrinkling or folding, which can result in leakage of the fluid material past the fluid impermeable layer or displacement of fecal material off of the pad onto the protected surface.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
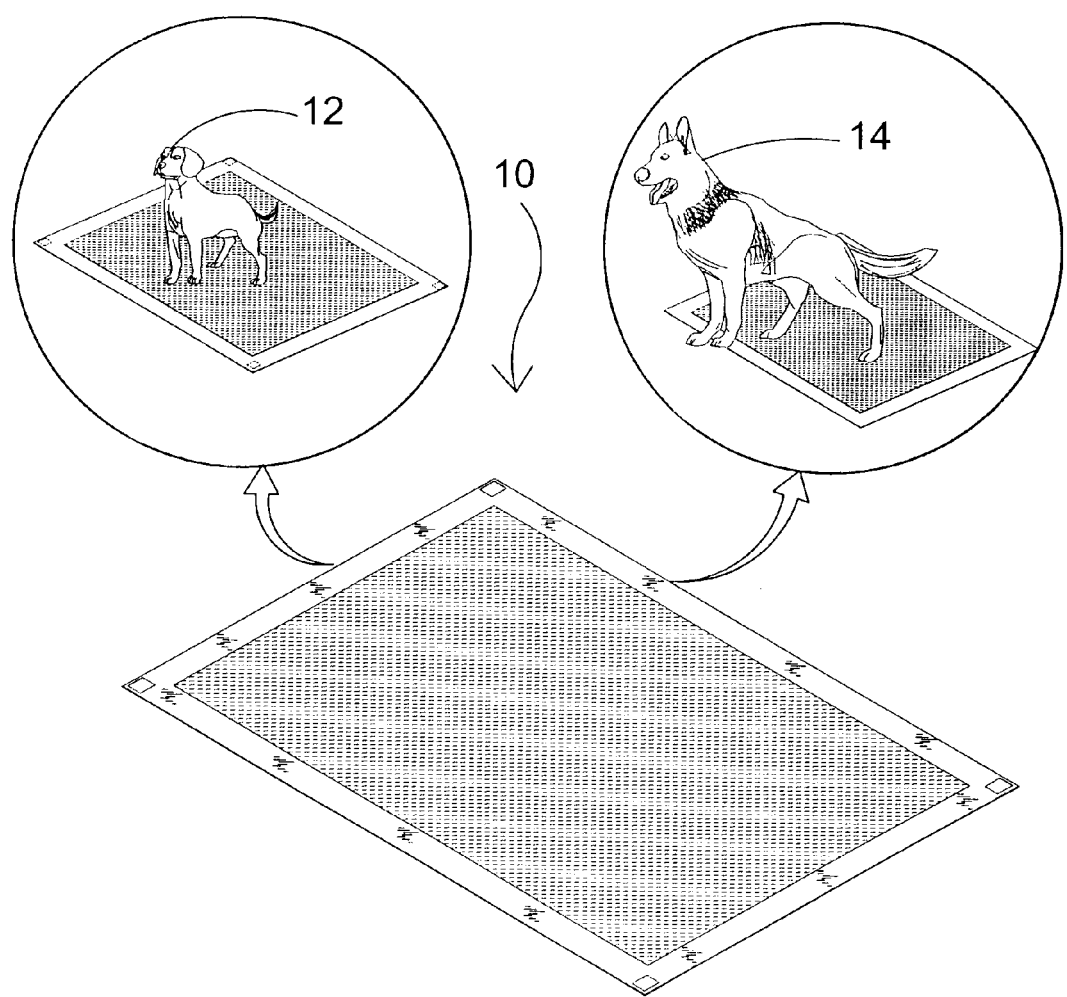
FIG. 1 is an illustrative view of the present invention in use.

With regard to reference numerals used, the following numbering is used throughout the drawings.

10 present invention
12 puppy
14 dog
16 absorbent pad
18 polymeric base
20 adhesive
22 fragrance sheet
24 floor
26 skirting
28 fragrant odor
30 cover
32 arrow
34 disposal
36 trash can

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 is an absorbent pad having adhesive elements positioned on the bottom side for anchoring the pad to a floor. The absorbent pad is encompassed along the periphery by the impermeable layer forming a hem having a green color simulating grass that is used as a training aid. The pad may incorporate a scented central layer for emitting a fragrance to attract a pet such as a puppy 12 or adult dog 14.

Figure 2:
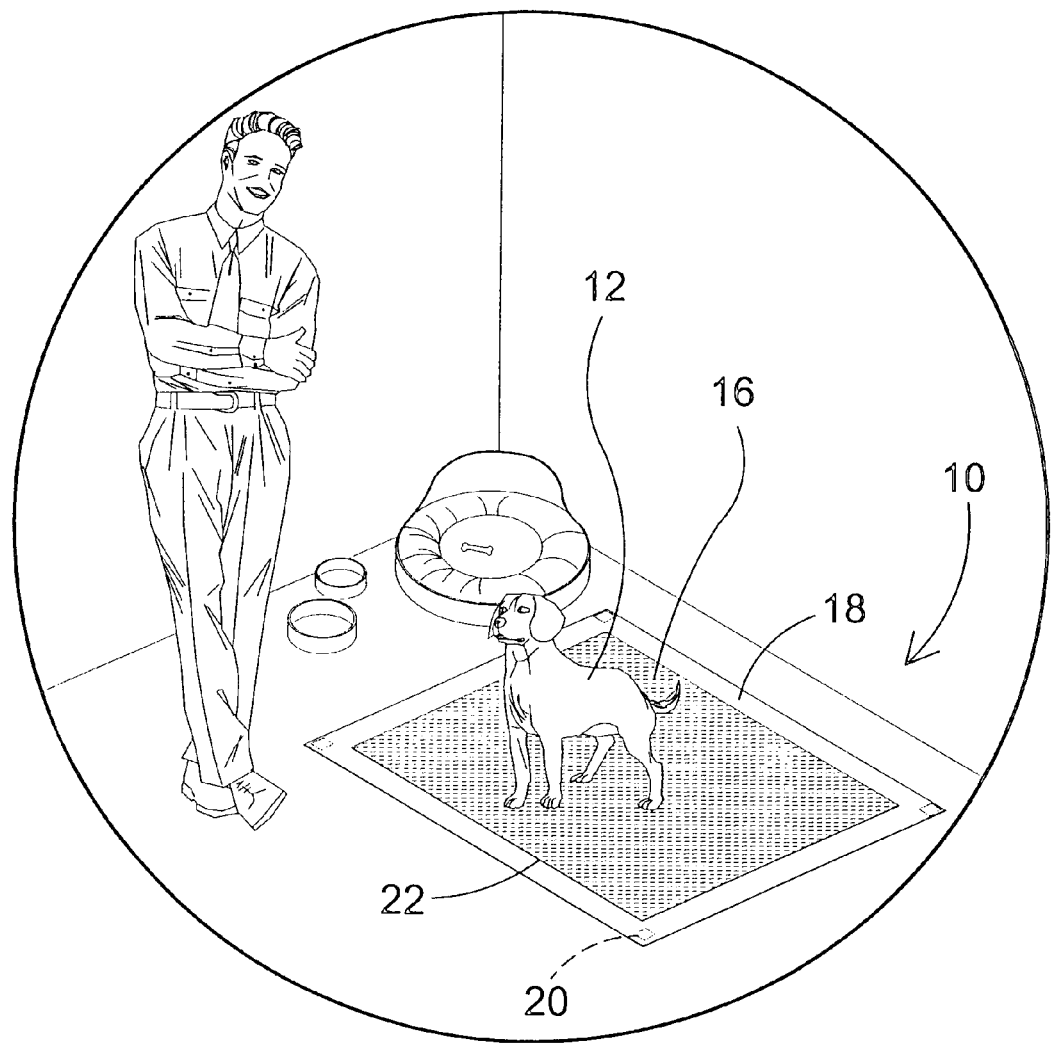
FIG. 2 is an illustrative view of the present invention in use.

Turning to FIG. 2, shown therein is an illustrative view of the present invention 10 in use. Shown is an illustrative view of the present invention 10 used as a training apparatus for a puppy 12. The present invention 10 is comprised of a plurality of material layers to retain fluids and solid material with absorbent pad 16, while preventing passage therethrough with polymeric base 18. In addition, the pad has placement retaining means, e.g., adhesive 20, to prevent displacement or movement, such as wrinkling or folding, which can result in leakage of the fluid material past the fluid impermeable layer or displacement of fecal material off of the pad onto the protected surface. Also shown is optional fragrance sheet 22.

Figure 3:
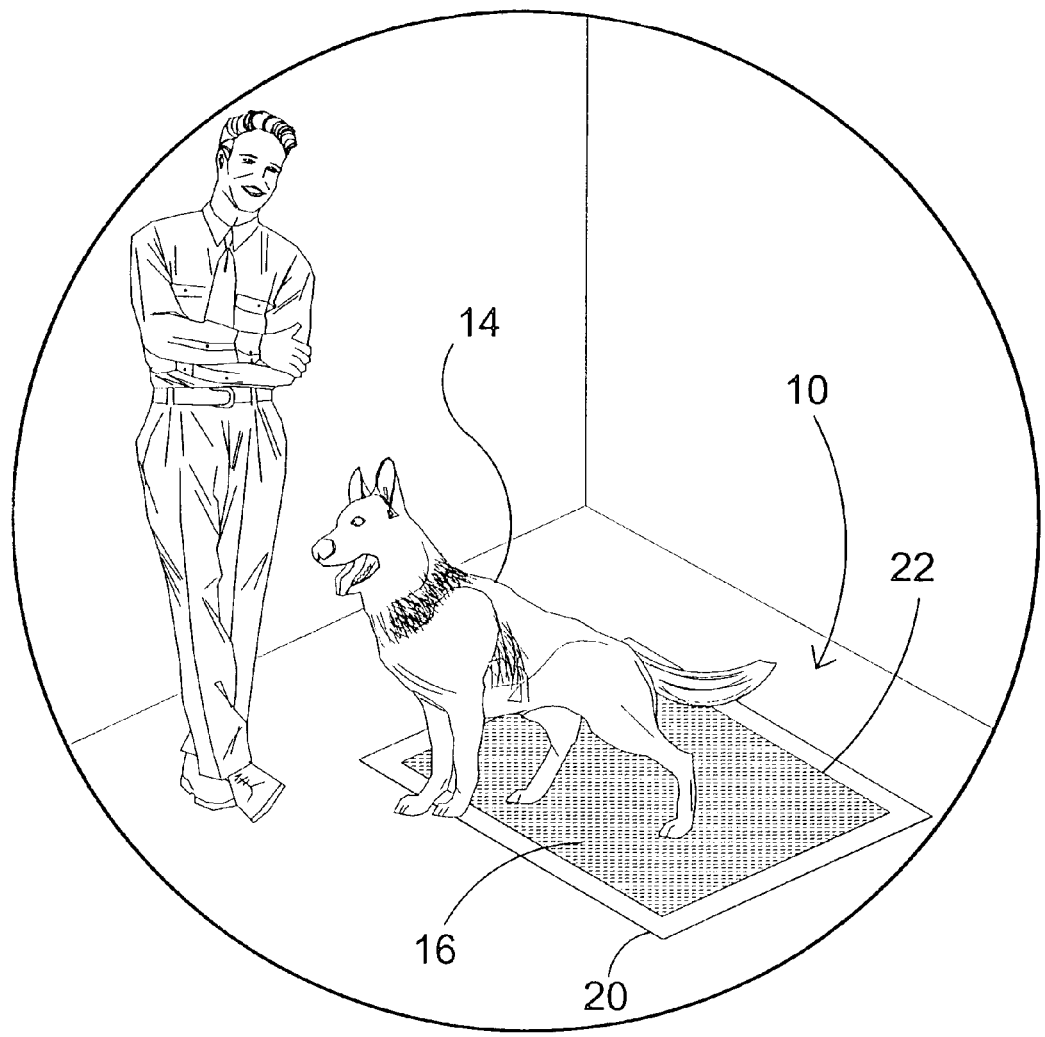
FIG. 3 is an illustrative view of the present invention in use.

Turning to FIG. 3, shown therein is an illustrative view of the present invention 10 in use. Shown is an illustrative view of the present invention 10 used by an adult dog 14. The top absorbent pad 16 is encompassed along the periphery by the impermeable layer forming a hem having a green color simulating grass that is used as a training aid. The bottom layer is a fluid impermeable layer to prevent passage of liquids. On the underside of the bottom layer, a plurality of adhesive 20 or frictional members are fastened thereto that will prevent movement, in whole or in part, from the selective placement of the pad. Optionally, a fragrance layer 22 can be incorporated into the pad between the fluid impermeable base layer and the top absorbent layer to attract pets to the pad.

Figure 4:
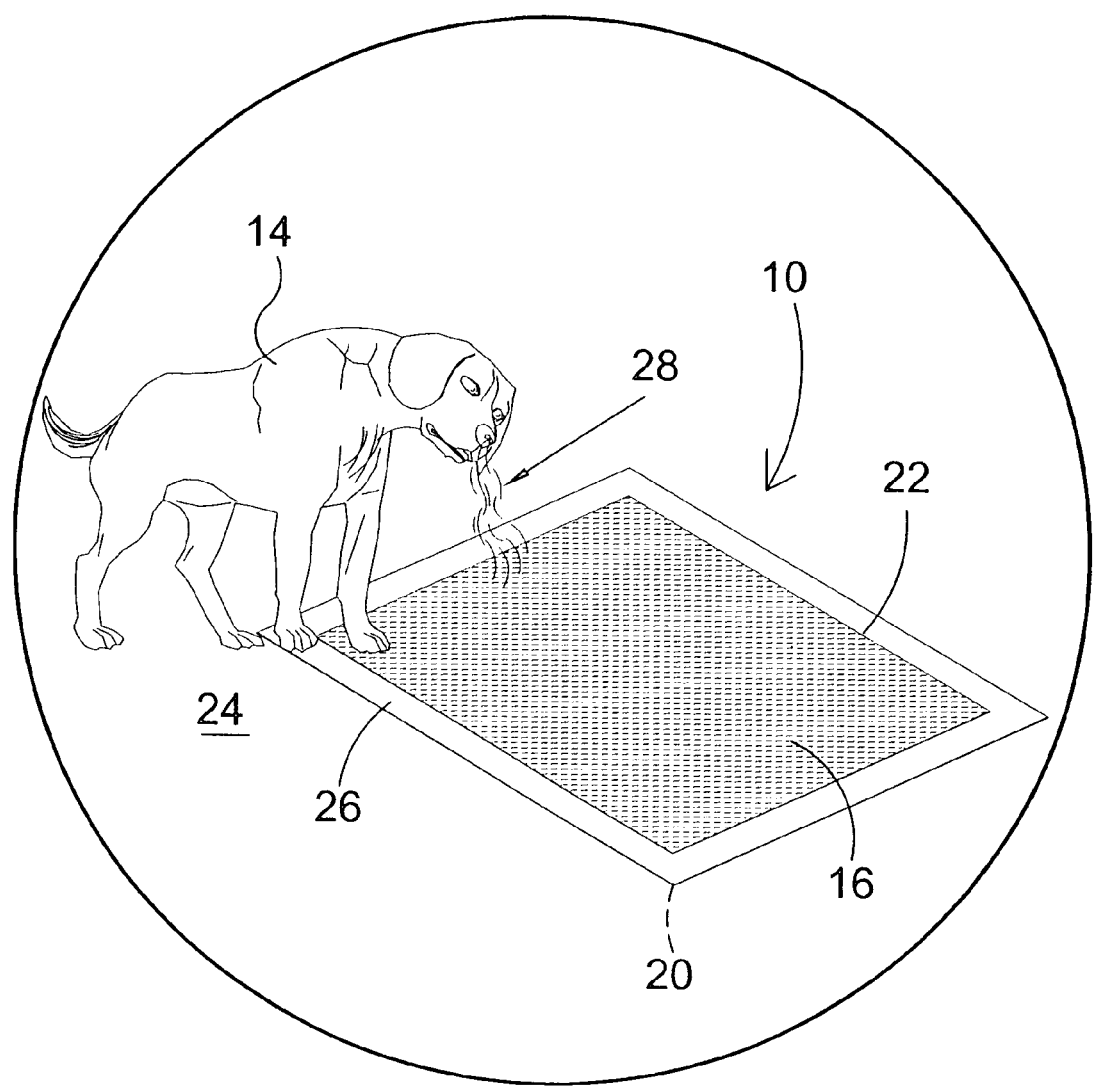
FIG. 4 is an illustrative view of the present invention in use.

Turning to FIG. 4, shown therein is an illustrative view of the present invention 10 in use. Shown is an illustrative view of the present invention 10 depicting the attractive features that entice the animal 14 into using the device. The present invention 10 is an absorbent pad 16 having adhesive elements 20 positioned on the bottom side for anchoring the pad to a floor 24. The top absorbent pad 16 is encompassed along the periphery by the impermeable layer forming a hem or skirting 26 having a green color simulating grass that is used as a training aid. The pad may incorporate a scented central layer 22 for emitting a fragrance 28 to attract a pet 14.

Figure 5:
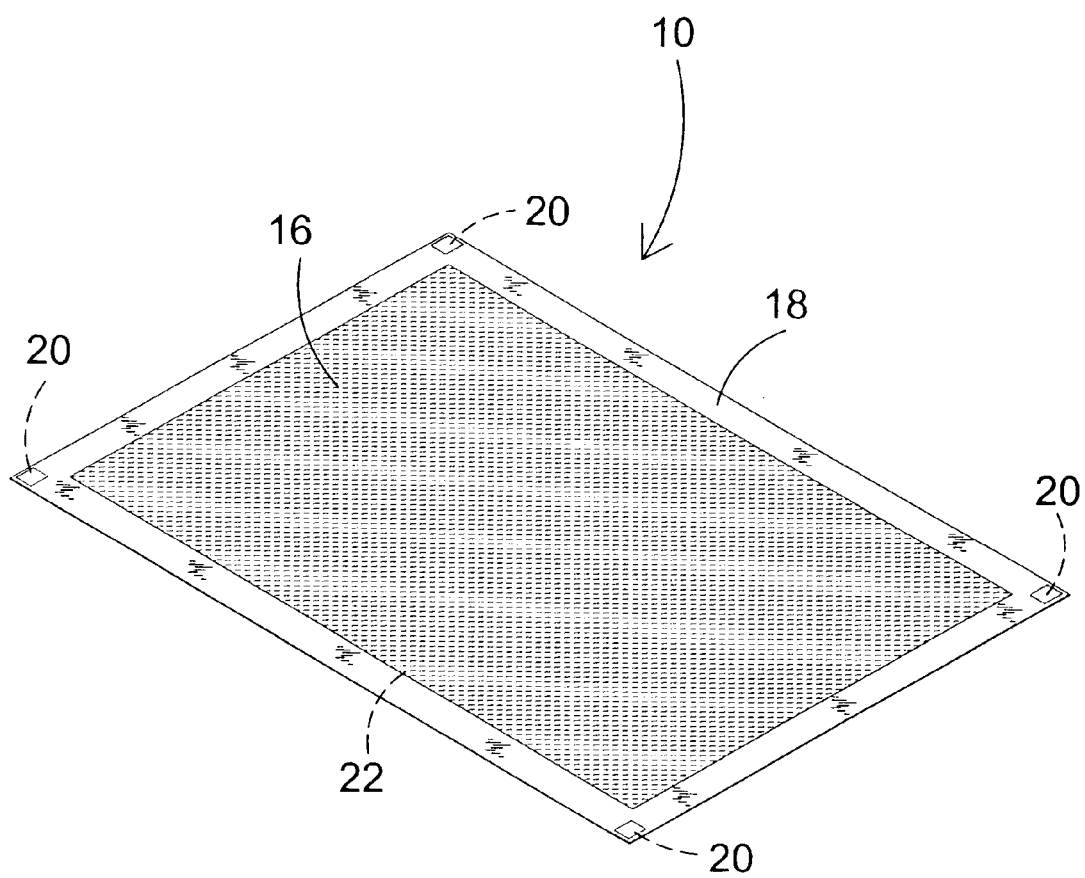
FIG. 5 is a perspective view of the present invention.

Turning to FIG. 5, shown therein is a perspective view of the present invention 10. Shown is a perspective view of the present invention 10 comprising a plurality of material layers used to absorb and retain urine and fecal matter deposited by pets. The top absorbent pad 16 is encompassed along the periphery by the impermeable layer forming a hem having a green color simulating grass that is used as a training aid. The bottom layer 18 is a fluid impermeable polymeric layer to prevent passage of liquids. On the underside of the bottom layer, a plurality of adhesive 20 or frictional members are fastened thereto that will prevent movement, in whole or in part, from the selective placement of the pad. Optionally, a fragrance layer 22 can be incorporated into the pad between the fluid impermeable base layer and the top absorbent layer.

Figure 6:
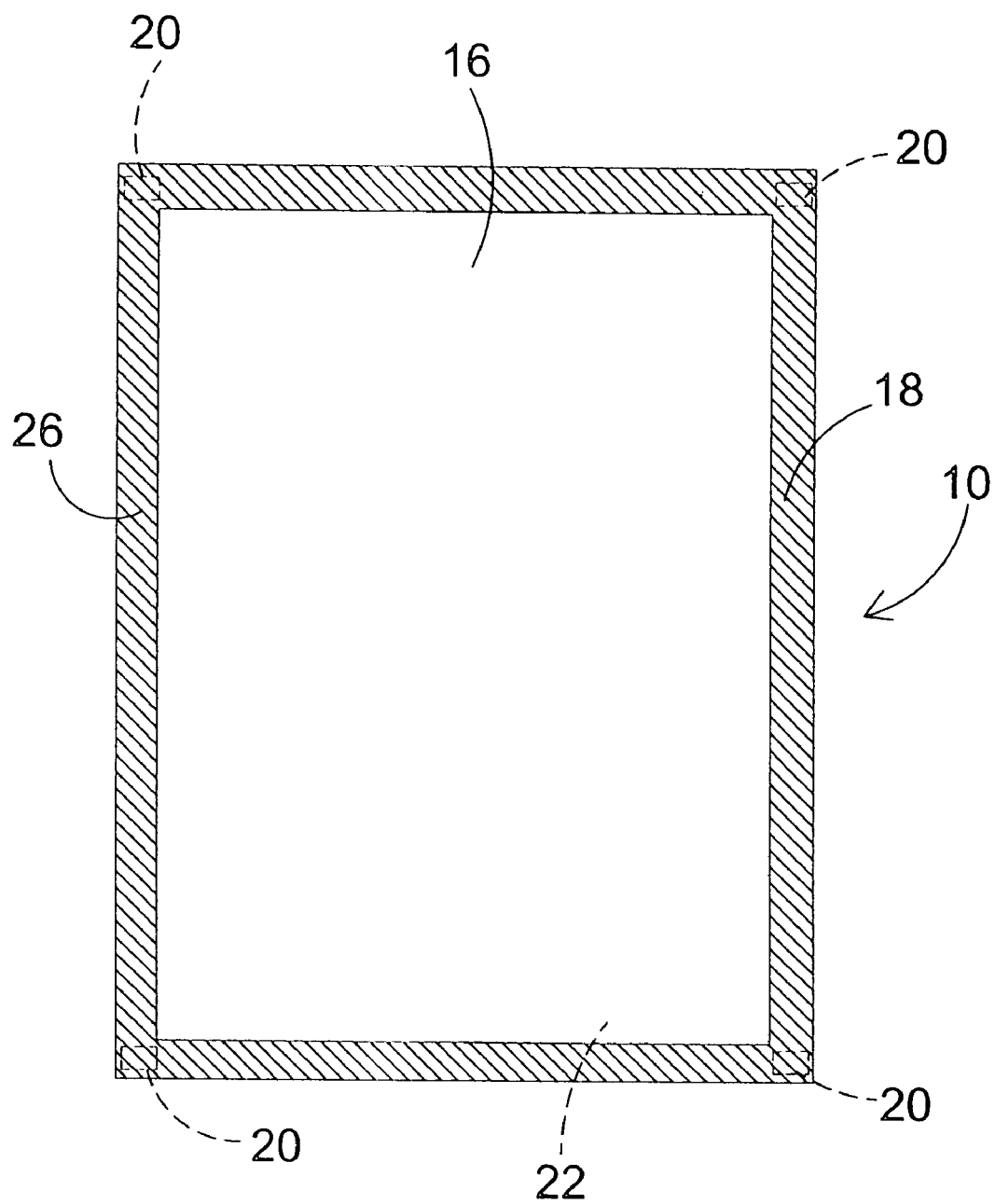
FIG. 6 is a frontal view of the present invention.

Turning to FIG. 6, shown therein is a frontal view of the present invention 10. The top absorbent pad 16 is encompassed along the periphery by the impermeable layer forming a hem 26 having a green color simulating grass that is used as a training aid. The bottom layer 18 is a fluid impermeable layer to prevent passage of liquids. On the underside of the bottom layer, a plurality of adhesive 20 or frictional members are fastened thereto that will prevent movement, in whole or in part, from the selective placement of the pad. Optionally, a fragrance layer 22 can be incorporated into the pad between the fluid impermeable base layer and the top absorbent layer to attract pets to the pad which may take any shape, e.g., rectangular or round.

Figure 7:
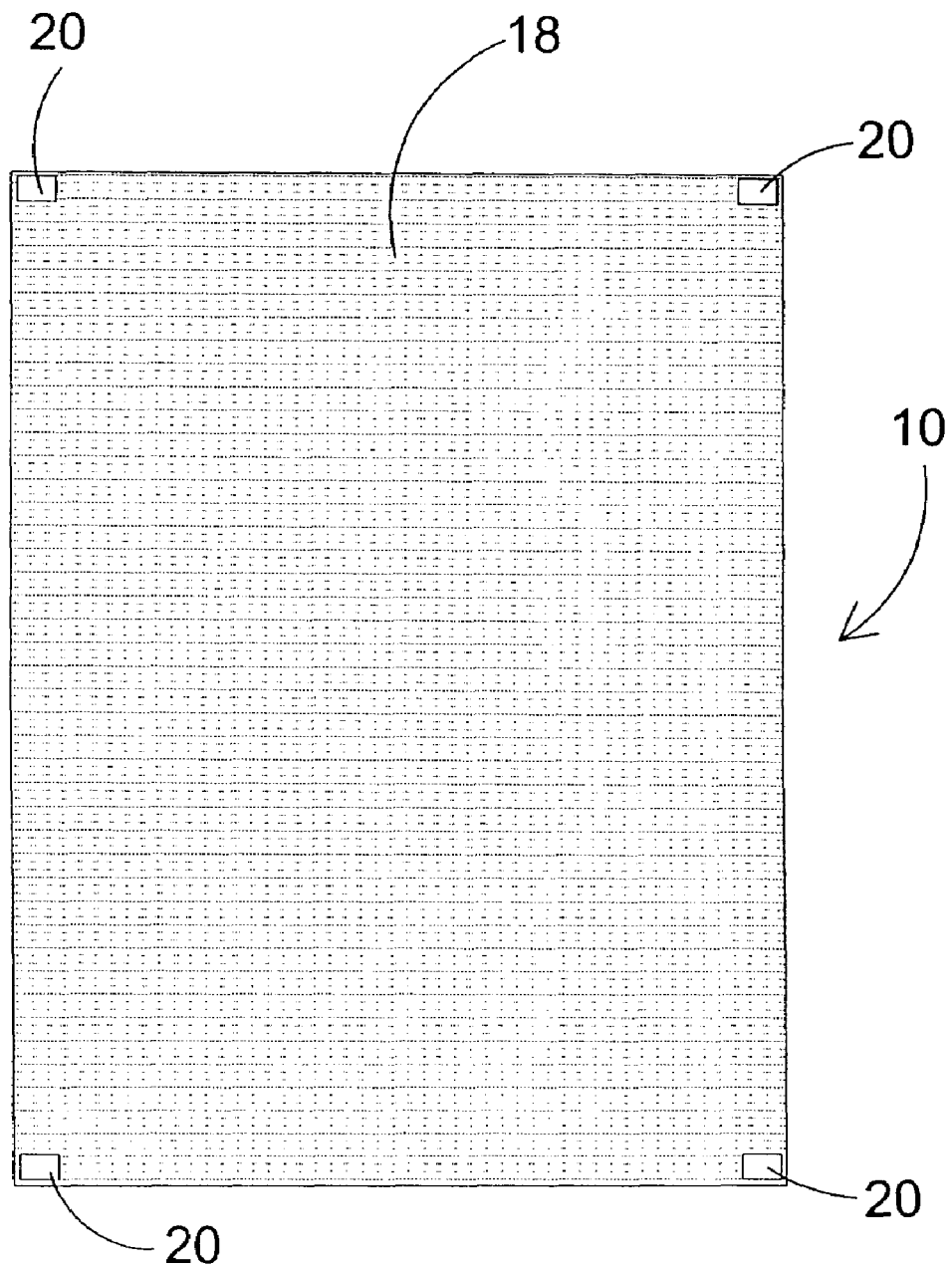
FIG. 7 is a rear view of the pad positioning retaining elements.

Turning to FIG. 7, shown therein is a rear view of the pad positioning retaining elements 20. Shown is a rear view of the present invention 10 having a plurality of frictional or adhesive members 20 fastened to prevent casual displacement, in whole or in part, of the selectively positioned pad. Also shown is the polymeric base 18.

Figure 8:
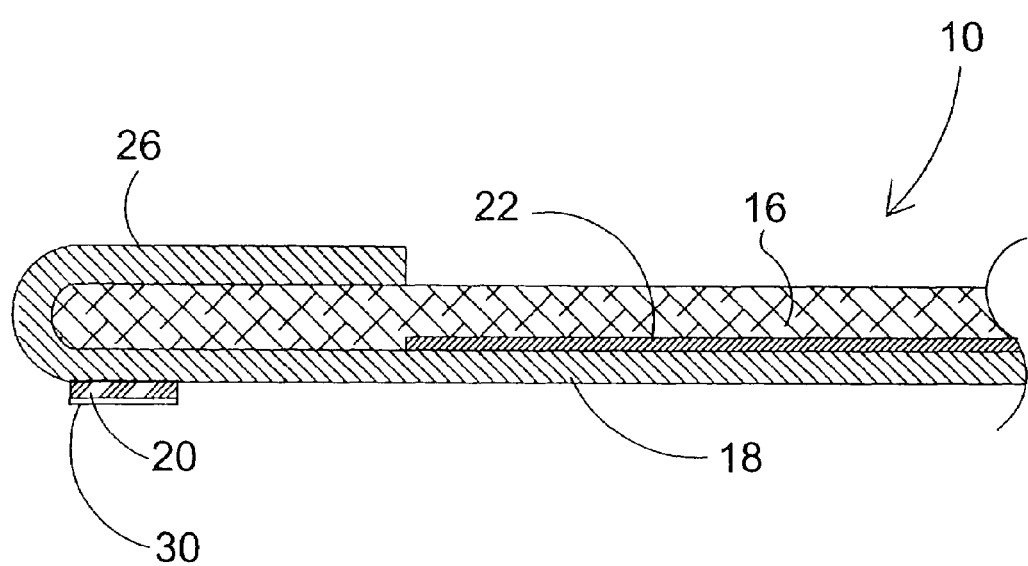
FIG. 8 is a sectional view of the present invention.

Turning to FIG. 8, shown therein is a sectional view of the present invention 10. Shown is a sectional view of the present invention 10 comprising a plurality of material layers used to absorb and retain urine and fecal matter deposited by pets. The top absorbent pad 16 is encompassed along the periphery by the impermeable layer forming a hem or skirt 26 having a green color simulating grass that is used as a training aid. The bottom layer 18 is a fluid impermeable polymeric layer to prevent passage of liquids. On the underside of the bottom layer, a plurality of adhesive or frictional members 20 with peelable covers 30 are fastened thereto that will prevent movement, in whole or in part, from the selective placement of the pad. Optionally, a fragrance layer 22 can be incorporated into the pad between the fluid impermeable base layer 18 and the top absorbent layer 16.

Figure 9:
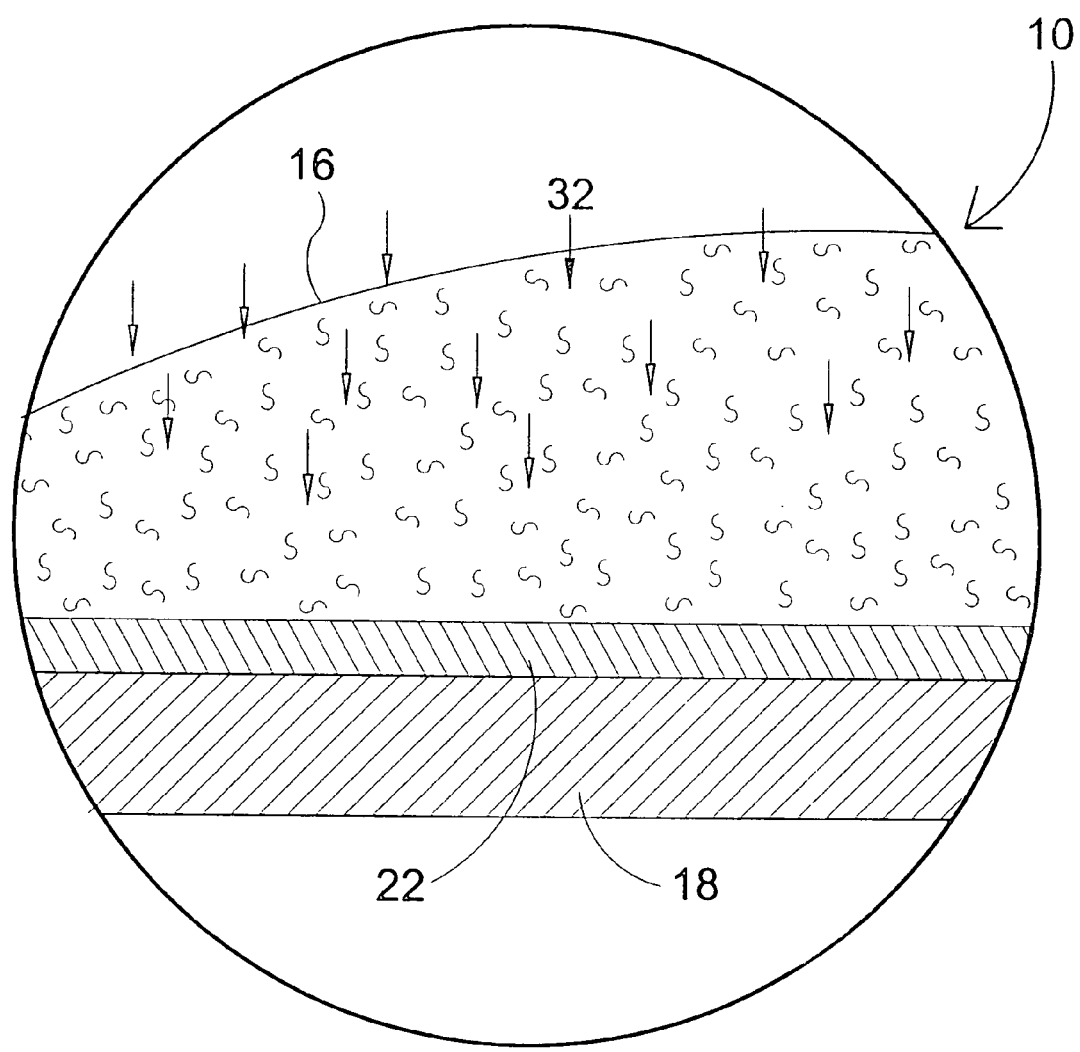
FIG. 9 is an enlarged sectional view of the present invention.

Turning to FIG. 9, shown therein is an enlarged sectional view of the present invention 10. The present invention 10 is comprised of a plurality of material layers used to absorb and retain urine indicated by arrows 32 and fecal matter deposited by pets. The top absorbent pad 16 is encompassed along the periphery by the impermeable layer forming a hem having a green color simulating grass that is used as a training aid. The bottom, polymeric layer 18 is a fluid impermeable layer to prevent passage of liquids. On the underside of the bottom layer 18, a plurality of adhesive or frictional members are fastened thereto that will prevent movement, in whole or in part, from the selective placement of the pad. Optionally, a fragrance layer 22 can be incorporated into the pad between the fluid impermeable base layer 18 and the top absorbent layer 16.

Figure 10:
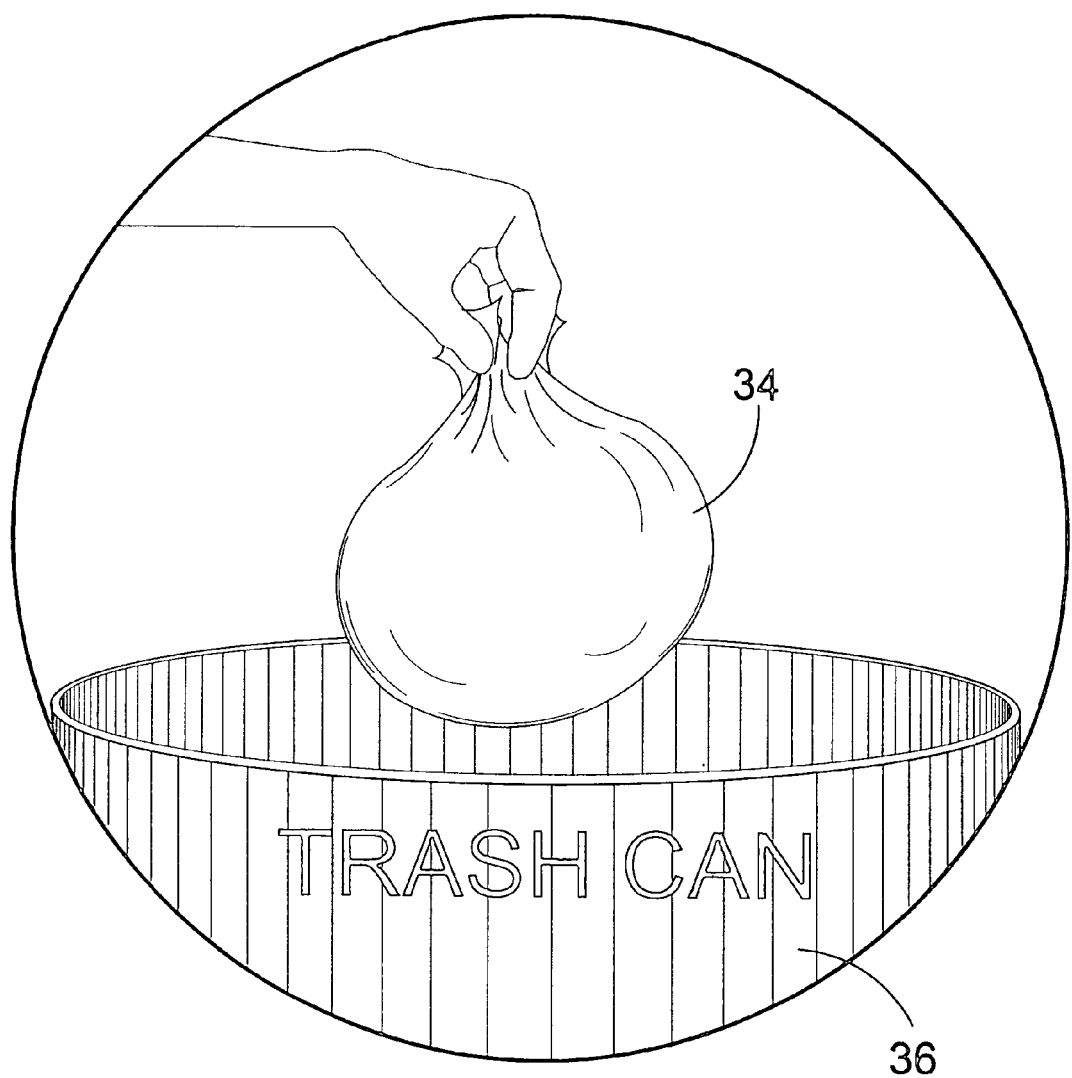
FIG. 10 is an illustrative view of the disposal of the present invention.

Turning to FIG. 10, shown therein is an illustrative view of the disposal of the present invention. The present invention is an absorbent pad having adhesive elements positioned on the bottom side for anchoring the pad to a floor. The top absorbent pad is encompassed along the periphery by the impermeable layer forming a hem having a green color simulating grass that is used as a training aid. The pad may incorporate a scented central layer for emitting a fragrance to attract a pet. Once used, the pad can be removed without the retaining members leaving any residue on the surface being protected and discarded as shown at 34 into trash can 36.

What is claimed to be new and desired to be protected by Letters Patent is set forth in the appended claims.

I claim:

1. An apparatus for a non-skid absorbent pad for use by animals, comprising:
   a) an upper absorbent layer for receiving animal wastes, said absorbent layer having a peripheral edge and a top and bottom surface;
   b) a bottom layer having a top and bottom surface, wherein said bottom layer is impermeable to fluids, wherein said top surface of said bottom layer is contiguous to said bottom surface of said absorbent layer, wherein said bottom layer has a peripheral edge extending beyond said peripheral edge of said absorbent layer, wherein said peripheral edge of said bottom layer extends around and over the whole peripheral edge of said absorbent layer so that a hem is formed contiguous to said top surface of said peripheral edge of said absorbent layer;
   c) a plurality of adhesive members being disposed on said bottom surface of said bottom layer so as to adhere the pad to an underlying supporting surface; and d) a fragrance layer being disposed between said absorbent layer and said bottom layer for attracting animals, said fragrance layer not extending to an edge of said bottom layer, said hem being colored green simulating grass.

2. The apparatus of claim 1, wherein the apparatus is disposable.

3. The apparatus of claim 2, wherein the apparatus if rectangular shaped.

4. The apparatus of claim 3, wherein said adhesive members are disposed on each of the corners of the rectangular apparatus.

5. The apparatus of claim 4, further comprising peel-off covers being disposed on the adhesive members for protecting the adhesive members.

6. The apparatus of claim 2, wherein the apparatus is round.

7. The apparatus of claim 2, wherein said bottom layer comprises polymeric material.

8. The apparatus of claim 2, wherein the animal is a dog.

* * * * *